US012578720B2

(12) United States Patent
von der Ohe et al.

(10) Patent No.: US 12,578,720 B2
(45) Date of Patent: Mar. 17, 2026

(54) PHASED MINIMUM RISK MANEUVER FOR TELEOPERATED VEHICLES

(71) Applicant: Vay Technology GmbH, Berlin (DE)

(72) Inventors: Thomas von der Ohe, Berlin (DE); Fabrizio Scelsi, Berlin (DE); Bogdan Djukic, Berlin (DE); Martin Scholl, Berlin (DE); Karsten Gordon, Berlin (DE); Norbert Bierhals, Berlin (DE)

(73) Assignee: Vay Technology GmbH, Berlin (DE)

( * ) Notice: Subject to any disclaimer, the term of this patent is extended or adjusted under 35 U.S.C. 154(b) by 39 days.

(21) Appl. No.: 18/073,607

(22) Filed: Dec. 2, 2022

(65) Prior Publication Data

US 2023/0176568 A1 Jun. 8, 2023

(30) Foreign Application Priority Data

Dec. 3, 2021 (EP) .................................... 21212186

(51) Int. Cl.
| | |
|---|---|
| *G05D 1/00* | (2024.01) |
| *B60T 7/12* | (2006.01) |
| *H04L 67/12* | (2022.01) |

(52) U.S. Cl.
CPC .............. *G05D 1/0022* (2013.01); *B60T 7/12* (2013.01); *H04L 67/12* (2013.01)

(58) Field of Classification Search
CPC ...... G05D 1/0022; G05D 1/0038; B60T 7/12; H04L 67/12
See application file for complete search history.

(56) References Cited

U.S. PATENT DOCUMENTS

| | | | | |
|---|---|---|---|---|
| 11,651,308 | B1* | 5/2023 | Viswanathan | ..... G06Q 10/0639 705/7.14 |
| 2017/0124781 | A1* | 5/2017 | Douillard | ............... G08G 1/207 |
| 2020/0351322 | A1* | 11/2020 | Magzimof | .............. H04L 41/16 |
| 2021/0403024 | A1* | 12/2021 | Shih | ................... G06Q 10/0833 |
| 2022/0200818 | A1* | 6/2022 | Bivans | .............. H04L 12/40071 |

FOREIGN PATENT DOCUMENTS

| | | | | |
|---|---|---|---|---|
| CN | 11259639 | A | * | 4/2021 |
| CN | 112596397 | A | * | 4/2021 |
| EP | 3910937 | A1 | | 11/2021 |
| WO | 2019035997 | A1 | | 2/2019 |

OTHER PUBLICATIONS

European Patent Office, Extended Search Report issued in EP 21212186.7-1205 dated May 4, 2022 (9 pages).
Neumeier, Stefan, et al., "Towards a Driver Support System for Teleoperated Driving," 2019 IEEE Intelligent Transportation Systems Conference (ITSC), IEEE, Oct. 27, 2019, pp. 4190-4196, Auckland, NZ (7 pages).

* cited by examiner

*Primary Examiner* — Nga X Nguyen
(74) *Attorney, Agent, or Firm* — Wood Herron & Evans LLP

(57) ABSTRACT

A method for controlling a teleoperated vehicle is provided, in particular for a shared mobility service. The method includes: driving the vehicle via a teleoperator station using a network; and determining a disturbance within said network. The method also includes starting a first braking maneuver for slowing down said vehicle, if a disturbance is determined within said network; and starting a second braking maneuver for stopping said vehicle, if a predetermined condition is met. A corresponding computer program and a teleoperated vehicle using this method are also provided.

11 Claims, 3 Drawing Sheets

PHASED MINIMUM RISK MANEUVER FOR TELEOPERATED VEHICLES

CROSS-REFERENCE TO RELATED APPLICATION

This application claims priority to European Patent Application No. 21212186.7, filed Dec. 3, 2021. The above-mentioned patent application is incorporated herein by reference in its entirety.

TECHNICAL FIELD

This application relates to a method for controlling a teleoperated vehicle, in particular in adverse network conditions. This application can be applied in cars, in particular motorcars, or automobiles. Although the embodiments of the invention will be described with respect to a car, the invention is not restricted to this particular vehicle, but may also be used in other road vehicles such as trucks or robots such as robotic humanoids.

BACKGROUND

Teleoperation is the ability of remotely controlling a vehicle from a distant location in real time, e.g. via teleoperator station and/or a teledriver.

Teleoperation may be used as a method for providing a consumer facing shared mobility service in urban environments. In this case, a vehicle would be driven remotely to a customer by a teledriver, in particular without any driver in said vehicle. Once said vehicle arrives at a customer's location, said customer may take over and drive said vehicle to any destination. Once at the destination, said customer may leave said vehicle, in particular not thinking about where to park since said vehicle is taken over again by said teledriver and be driven to a next customer.

In addition, teleoperation may also be considered to be a bridge between current self-driving capabilities and the requirements needed for widespread adoption of autonomous vehicles, e.g. in situations of 'edge cases', where the autonomous vehicle software stack has low confidence level in its ability to perform the correct action, or when the vehicle needs to operate outside of its standard operating parameters.

Such a teleoperation is usually performed by a teleoperator via a network, in particular a wireless communication, preferably a cellular network. For said teleoperation, said teleoperator may run a teleoperator station (hereafter referred to as "telestation") comprising means for remotely controlling vehicles, in particular teleoperated vehicles.

However, said network may be disturbed leading to potential safety concerns during the teleoperation.

Thus, it would be desirable to provide a method for controlling a teleoperated vehicle, in particular during network disturbances or disruptions.

SUMMARY

These and other technical objects and problems are addressed by the embodiments provided in this invention. To this end, according to a first set of embodiments of the invention, a method for controlling a teleoperated vehicle, in particular for a shared mobility service, is proposed, including the steps of: driving said vehicle via a teleoperator station using a network; determining a disturbance within said network; starting a first braking maneuver for slowing down said vehicle, if a disturbance is determined within said network; and starting a second braking maneuver for stopping said vehicle, if a predetermined condition is met.

Thus, a phased minimum risk maneuver (MRM) for teleoperated vehicles is proposed, in particular for automobiles, cars, motorcars, trucks, vans or the like or any other vehicle type.

Preferably, the proposed method is used within a shared mobility service, in particular in or during adverse network conditions, e.g. during network latency spikes.

In order to teleoperate said vehicle, video and/or audio data obtained by said vehicle are used, e.g. by a sensor on said vehicle. Said sensor maybe a microphone and/or a camera and/or the like.

Preferably, said video and/or audio data obtained by said vehicle is sent by said vehicle to a teleoperator station, e.g. via cellular network, in particular as a bitstream. Said video and/or audio data is then used to remotely control said vehicle in real time, e.g. by a teledriver. For this, said video and/or audio data may be displayed in said teleoperator station, e.g. via a display in front of said teledriver. In order to remotely control said vehicle, said teleoperator station may comprise control elements for remotely controlling said vehicle, e.g. control elements for steering commands and the like. Thus, said teledriver is able to send steering, throttle and brake commands to said vehicle accordingly, in particular via a bitstream and/or via a or said cellular network.

In one embodiment, said teleoperated vehicle is an autonomous vehicle, which is remotely controlled.

In another embodiment, said teleoperated vehicle is a vehicle, which is remotely assisted.

In a preferred embodiment, said teleoperated vehicle is, in particular directly, driven by a teledriver, e.g. via a teleoperator station.

Preferably, said teleoperated vehicle is directly driven by an operator of a teleoperator station using teleoperation, e.g. by using video and/or audio data and/or a visually validated path.

For controlling said teleoperated vehicle, a network may be used, e.g. a network having wireless communication like radio communication.

In a first step, a disturbance within said network is determined, in particular detected, e.g. by latency, preferably latency spikes, in particular by detecting a short cellular network latency spike.

Preferably, said latency is an end-to-end latency, in particular between said vehicle and said teleoperator station. For example, the end-to-end latency is the time for sending a single video frame from the vehicle to the teleoperator station and receiving a response by said teleoperator station.

Preferably, said disturbance is determined by a control unit of said vehicle, e.g. by detecting a latency, in particular an end-to-end latency between said vehicle and said teleoperator station.

If a disturbance is determined, in particular detected, within said network, a first braking maneuver is started for slowing down said vehicle, e.g. by gentle braking. In particular, said vehicle enters a fault state if the end-to-end latency is above a threshold, preferably a predefined, configurable threshold. For example, said threshold is 250 ms. So, if it takes more than 250 ms to send a video frame from the vehicle to the teleoperator station and receive a command back, this is considered a fault.

Preferably, said disturbance is determined via configurable latency threshold, in particular between 200 ms and 1000 ms, preferably between 200 ms and 500 ms.

After a disturbance is detected within said network, a first and a second braking maneuver may be started.

For example, said vehicle enters a fault state if the value for the end-to-end latency exceeds a predefined value. If said network conditions improve within a predefined time (e.g. 500 ms), the so-called recoverable-fault-window, i.e. the fault condition is no longer met before the recoverable-fault-window ends, the fault counts as recovered. If, on the other hand, the fault condition is still present at the end of the recoverable-fault-window, the fault is considered as not recovered.

So, the first braking maneuver starts immediately after the fault has been detected. There are two possible end conditions for the first braking maneuver. In case the fault condition is no longer met and the recoverable-fault-window is not yet over (recovered), the teleoperator resumes control. In case, the fault condition is still met and the recoverable-fault-window is over (not recovered), the second braking maneuver starts. The second braking maneuver lasts until the vehicle has stopped.

Hence, said second braking maneuver is only started if a predetermined condition is met, e.g. a predefined time, in particular the end of a recoverable-fault-window.

Thus, a phased minimum risk maneuver for teleoperated vehicles is proposed, in particular a two-phase emergency braking solution, preferably comprising a first phase and a second phase. In the first phase a gentle brake is performed and then, if needed, a harsh brake is performed in the second phase forcing said vehicle to stop.

The proposed phased approach herein minimizes the potential safety concerns for rear traffic collision and stopping the middle of intersections.

In a preferred embodiment, said network is a cellular network and/or based on at least one of the following: wireless communication, radio communication.

A cellular network or mobile network is a communication network where the link to and from end nodes is wireless. The network is distributed over land areas called "cells", each served by at least one fixed-location transceiver (typically three cell sites or base transceiver stations). These base stations provide the cell with the network coverage, which can be used for transmission of voice, data, and other types of content. A cell typically uses a different set of frequencies from neighboring cells, to avoid interference and provide guaranteed service quality within each cell.

For example, said network is based on a wireless network, in particular for a communication between said vehicle and said teleoperator station. Preferably, said communication comprises video data of a path for said vehicle and/or steering wheel commands for said vehicle.

In a preferred embodiment, said disturbance is determined, in particular detected, based on at least one of a value for network latency; an end-to-end latency.

For example, the latency of said network is measured or estimated and if a predetermined threshold for said latency is exceeded, a disturbance is assumed.

In a preferred embodiment, said disturbance is at least one of the following: network latency spike, unexpected CPU and/or memory consumption, in particular on the vehicle and/or teleoperator station or any other latency that can be introduced in the software components of the teleoperation solution.

In a preferred embodiment, the first braking maneuver is immediately started after a disturbance is determined, in particular detected.

For example, a network latency is detected which exceeds a predetermined threshold, then, the first braking maneuver is immediately started.

In a preferred embodiment, during said first braking maneuver, said vehicle is slowed down with an acceleration between $-1.5$ m/s$^2$ and $-4.0$ m/s$^2$, preferably $-2.0$ m/s$^2$ and $-3.0$ m/s$^2$ or until said wireless communication is recovered or until the speed of said vehicle is 0 m/s.

Any acceleration described herein is described by using the International System of Units, wherein m/s$^2$ equals meter per second squared. However, any acceleration may be described with corresponding units of other system.

For example, a network latency is detected which exceeds a predetermined threshold, then said vehicle is slowed down with an acceleration between $-1.5$ m/s$^2$ and $-4.0$ m/s$^2$. If a recoverable-fault-window with 500 ms is set, this may stop said vehicle in some cases.

In a preferred embodiment, said second braking maneuver is, in particular immediately, started if said network does not fully recover during the first brake maneuver.

In a preferred embodiment, during said second braking maneuver, said vehicle is stopped, in particular with an acceleration between $-5.0$ m/s$^2$ and $-15.0$ m/s$^2$ or until said vehicle has a speed of 0 m/s$^2$.

Preferably, said second braking maneuver is performed until said vehicle stops.

Thus, the first and the second braking maneuver are performed with different decelerations, for example a gentle brake of $-2.0$ m/s$^2$ during the first braking maneuver and a harsh brake of $-5.0$ m/s$^2$ during the second braking maneuver.

According to another set of embodiments of the invention, a computer program is proposed, comprising program code for performing steps for controlling a teleoperated vehicle as described above or below when said program is run on a computer.

According to another set of embodiments of the invention, a computer readable medium is prosed, carrying a computer program comprising program code for performing steps for controlling a teleoperated vehicle as described above or below when said program product is run on a computer.

According to another set of embodiments of the invention, a control unit for a vehicle is proposed, configured to perform the steps for controlling a teleoperated vehicle as described above or below.

According to another set of embodiments of the invention, a control device for a vehicle is proposed, including optionally a computer and at least one of a computer program as described above or below, a computer readable medium as described above or below, a control unit as described above or below.

According to another set of embodiments of the invention, a teleoperated vehicle is proposed, including a control device as described above or below and/or at least one sensor for collecting video and/or audio data of at least one side of said vehicle and/or a communication device for sending said video and/or audio data to a teleoperator station and/or a communication device for receiving control commands of said teleoperator station.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one of more embodiments of the invention and, together with the general description given above and the detailed description given below, explain the one or more embodiments of the invention.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood, that the drawings are not necessarily drawn to scale and that, unless otherwise indicated, they are merely intended to conceptually illustrate the structures and procedures described herein.

DETAILED DESCRIPTION

Figure 1:
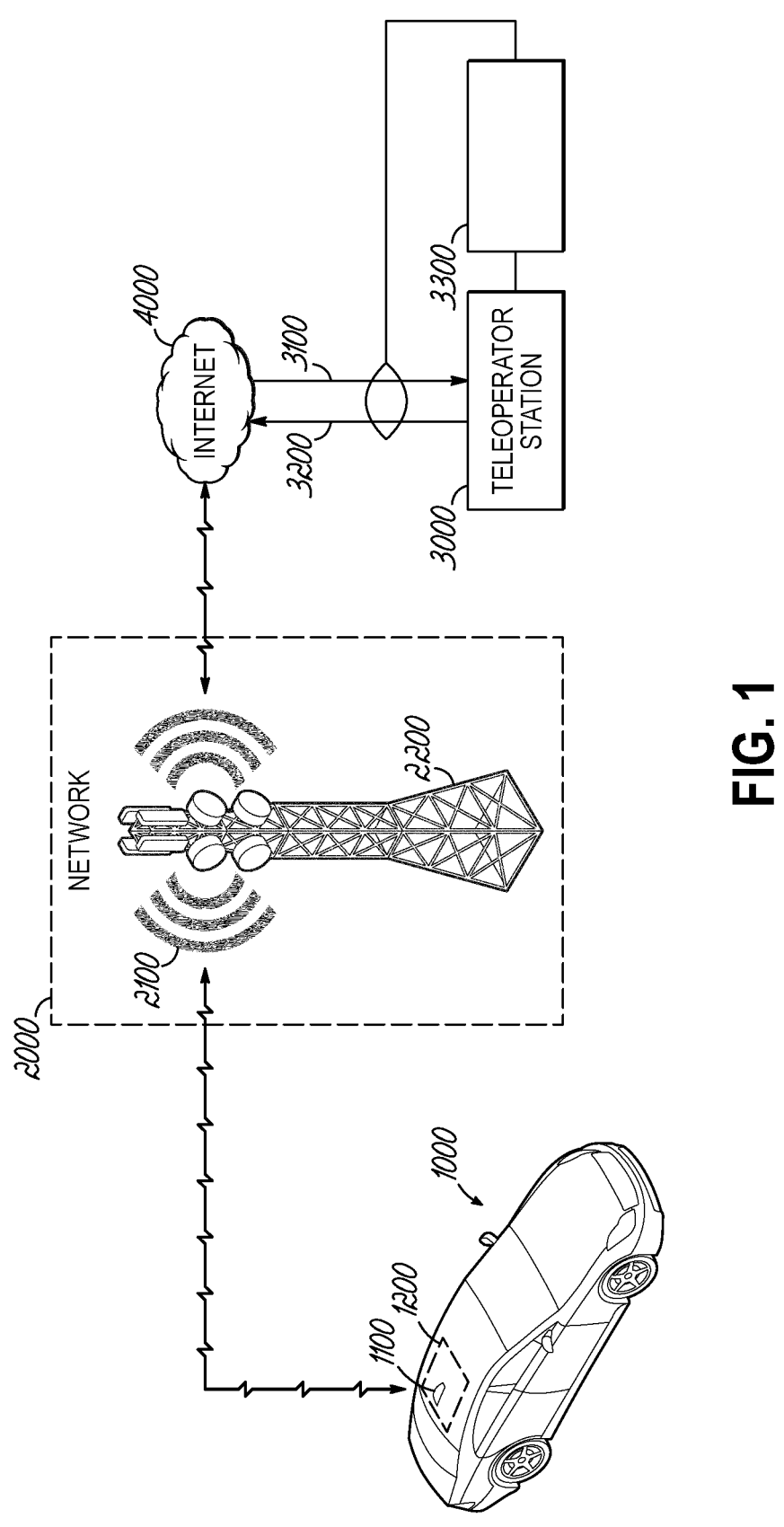
FIG. 1 shows a teleoperated vehicle in a preferred embodiment.

FIG. 1 shows a teleoperated vehicle 1000, which is teleoperated via a network 2000 by a teleoperator station 3000.

Said teleoperated vehicle 1000, e.g. a car, comprises an antenna 1100 and a control unit 1200.

Said antenna 1100 is configured for communicating with said network 2000, e.g. sending data to said network and/or receiving data from said network. In addition, said antenna 1100 is connected to said control unit 1200 in order to control said vehicle 1000.

Said control unit 1200 is configured for communicating with said antenna 1100, e.g. sending data to said antenna und/or receiving data from said antenna, and for controlling said teleoperated vehicle 1000, e.g. steering and/or braking.

Said network 2000 uses cellular communication and may comprise a network mast 2200.

Said network 2000 is also connected to a teleoperator station 3000, e.g. via the internet 4000.

Said teleoperation station 3000 receives data 3100, in particular sensor data of said teleoperated vehicle 1000, e.g. video data and audio data, and sends control data 3200, e.g. steering wheel commands or throttle and braking commands, to said teleoperated vehicle 1000. Within said teleoperator station 3000, an operator, a human being, controls said vehicle, e.g. by direct driving.

Preferably, said control unit 1200 is configured to perform a method for controlling a teleoperated vehicle, in particular as described herein, e.g. performing a phased minimum risk maneuver.

The teleoperation station 3000 may also comprise an intelligent perception system for monitoring the environment of said vehicle, e.g. by using the video data 3100.

Figure 2:
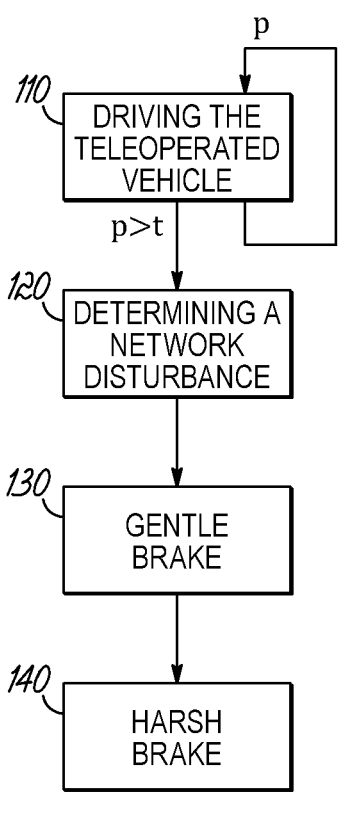
FIG. 2 shows an embodiment of a method for controlling a teleoperated vehicle.

FIG. 2 shows an embodiment of a method 100 for controlling a teleoperated vehicle.

In a first step 110, said vehicle is directly driven by teleoperation, in particular as described above.

During said teleoperation, at least one parameter p is observed, e.g. a network latency.

If said parameter p exceeds a predetermined threshold t, a disturbance within said network is determined in a next step 120.

If a disturbance within said network is determined, a first braking maneuver is started, in particular in a next step 130.

Said first braking maneuver is preferably a gentle brake.

If then a predetermined condition is met, a second braking maneuver is started, in particular in a next step 140.

Said second braking maneuver is preferably a harsh brake.

Figure 3:
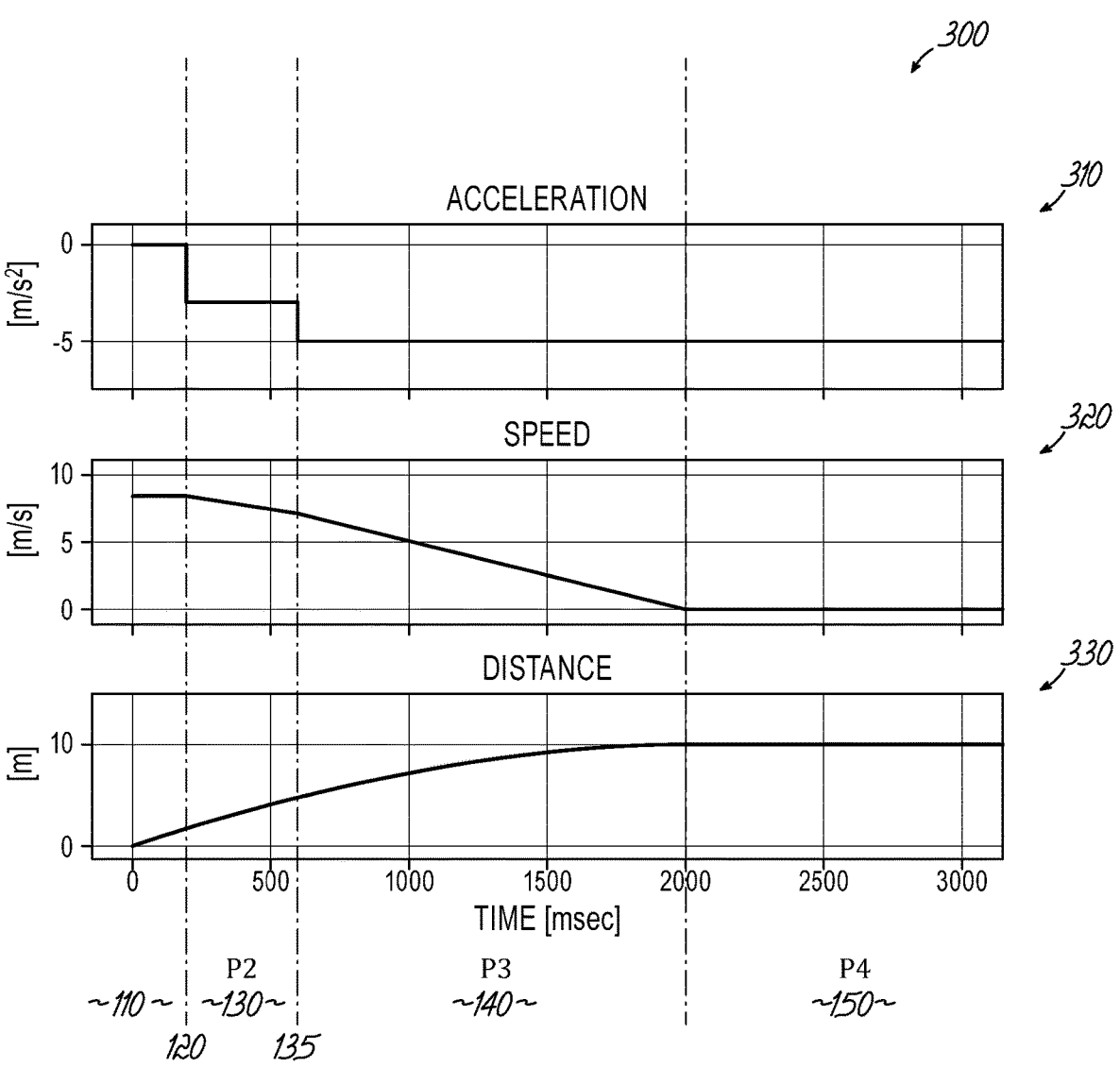
FIG. 3 shows a diagram of a braking vehicle.

FIG. 3 shows a diagram 300 of a braking vehicle, in particular in case of failed recovery.

The diagram 300 comprises three sections 310, 320, 330.

The upper section 310 shows the acceleration of said vehicle 1000 over time, the middle section 320 shows the corresponding speed of said vehicle 1000 over time and the lower section 330 shows the corresponding distance of the vehicle 1000 over time.

In a first step 110 of method 100, said vehicle is teleoperated driven.

In the next step 120, a network disturbance is determined, e.g. by detecting a network latency spike. This is the case if the value for the end-to-end latency exceeds a predefined value.

In a next step 130, in particular after the network disturbance is determined, a gentle brake is performed, e.g. with $-3$ m/s$^2$. This braking maneuver is a trade-off between the two possible subsequent actions, which are either a successful recovery and resumed teleoperations or a failed recovery and autonomous emergency braking of the vehicle. In particular, said braking is performed during the phase to reduce the vehicle speed and build up a braking pressure. Both help reduce the risk of front-end collisions. At the same time, the braking is still gentle to reduce rear-end collisions and minimize a negative impact on traffic flow.

In a next step 135, a predetermined condition may be met. For example, the end-to-end latency still exceeds the predefined threshold at the end of the recoverable-fault-window. In this case, the vehicle enters the second phase, which is the emergency minimum risk maneuver (MRM).

Consequently, in every case where the recovery fails, the first braking phase always takes the same time, namely the duration of the recoverable-fault-window. In each case the recovery succeeds, the duration of the first braking phase can be different, since in that case this phase ends as soon as the end-to-end latency is below the threshold. For a successful recovery, the first braking phase cannot take longer than the recoverable-fault-window.

In a next step 140 and in particular after the predetermined conditions is met, a harsh brake is performed, in particular until said vehicle is fully stopped. This also means that the deceleration of the second braking maneuver, e.g. $-5$ m/s$^2$, is higher than the first braking maneuver, e.g. $-3$ m/s$^2$.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

FURTHER REFERENCE CHARACTERS USED
IN DRAWINGS

O object
p parameter
t threshold

What is claimed is:
1. A method for controlling a teleoperated vehicle, comprising:

driving, by a teledriver operator, said vehicle via a tele-operator station using a network, the teledriver operator being located at the teleoperator station remote from the vehicle and directly driving the vehicle using commands issued through the network;

determining, by a control unit on the vehicle, a disturbance within said network, wherein the disturbance is determined based on detecting at least one of: a value for network latency, and an end-to-end latency, wherein the disturbance based on latency adversely affects the teledriver operator's ability to drive the vehicle via communications with the teleoperator station;

starting, by the control unit on the vehicle, a first braking maneuver for slowing down said vehicle, when a disturbance is determined within said network; and starting, by the control unit on the vehicle, a second braking maneuver for stopping said vehicle, when a further predetermined condition regarding the disturbance within the network is met.

2. The method for controlling a teleoperated vehicle of claim 1, wherein said network is a cellular network and/or based on at least one of the following:

wireless communication; and radio communication.

3. The method for controlling a teleoperated vehicle of claim 1, wherein said disturbance is at least one of the following:

network latency spike;

unexpected CPU and/or memory consumption; and a software latency.

4. The method for controlling a teleoperated vehicle of claim 1, wherein the first braking maneuver is immediately started after a disturbance is determined.

5. The method for controlling a teleoperated vehicle of claim 1, wherein during said first braking maneuver, said vehicle is slowed down:

with an acceleration between −1.5 m/s$^2$ and −4 m/s$^2$;

until a wireless communication is recovered; or until said vehicle has a speed of 0 m/s.

6. The method for controlling a teleoperated vehicle of claim 1, wherein said second braking maneuver is started if said network does not fully recover during the first braking maneuver and/or before a visually validated path is completed.

7. The method for controlling a teleoperated vehicle of claim 1, wherein during said second braking maneuver, said vehicle is stopped:

with an acceleration between −5.0 m/s$^2$ and −15.0 m/s$^2$; or until said vehicle has a speed of 0 m/s.

8. The method for controlling a teleoperated vehicle of claim 2, wherein the method is performed for a shared mobility service, and:

wherein said disturbance is at least one of the following:

network latency spike;

unexpected CPU and/or memory consumption; and a software latency;

wherein the first braking maneuver is immediately started after a disturbance is determined;

wherein during said first braking maneuver, said vehicle is slowed down:

with an acceleration between −1.5 m/s$^2$ and −4 m/s$^2$;

until said wireless communication is recovered; or until said vehicle has a speed of 0 m/s;

wherein said second braking maneuver is immediately started if said network does not fully recover during the first braking maneuver and/or before a visually validated path is completed; and wherein during said second braking maneuver, said vehicle is stopped:

with an acceleration between −5.0 m/s$^2$ and −15.0 m/s$^2$; or until said vehicle has a speed of 0 m/s.

9. A computer readable medium carrying a computer program product, comprising program code configured to perform the steps of claim 1 when said program product is run on a computer.

10. A teleoperated vehicle, comprising a control device that comprises:

a computer, and at least one of:

the computer readable medium of claim 9, and the control unit configured to perform the steps of the method of claim 1.

11. The teleoperated vehicle of claim 10, further comprising:

at least one sensor for collecting video and/or audio data of at least one side of said vehicle;

a communication device for sending said video and/or audio data to a teleoperator station; and a communication device for receiving control commands of said teleoperator station.

* * * * *